(Model.)
E. A. FLOYD.
ARTIFICIAL TOOTH.
No. 384,836. Patented June 19, 1888.
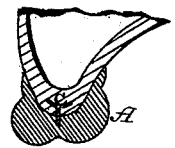
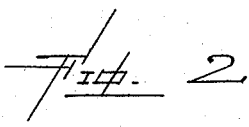
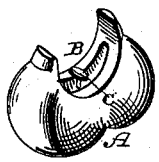

UNITED STATES PATENT OFFICE.

EDWARD A. FLOYD, OF PAOLA, KANSAS.

ARTIFICIAL TOOTH.

SPECIFICATION forming part of Letters Patent No. 384,836, dated June 19, 1888.

Application filed March 19, 1887. Serial No. 231,549. (Model.)

*To all whom it may concern:*

Be it known that I, EDWARD A. FLOYD, of Paola, in the county of Miami and State of Kansas, have invented certain new and useful Improvements in Artificial Teeth; and I do hereby declare the following to be a full, clear, and exact description of the invention, such as will enable others skilled in the art to which it pertains to make and use it, reference being had to the accompanying drawings, which form part of this specification.

My invention relates to an improvement in artificial teeth; and it consists in the combination of a dental plate with an artificial tooth having a transverse groove across its inner end, and a flat-headed pin which is inserted in the bottom of the groove in the tooth and made to catch in the artificial plate, as will be more fully described hereinafter.

The object of my invention is to so groove the inner ends of the plates that they will straddle over the ridge of the dental plate, and to provide them with large-headed pins, around which the material out of which the plate is formed can be readily packed, and thus enable the teeth to be secured more readily and easily to the plates than has heretofore been possible.

Figure 1 is a vertical section taken through a tooth and dental plate, showing the tooth in position. Fig. 2 is an enlarged perspective showing the groove in the tooth and the pin.

A represents an artificial tooth, which has a deep groove, B, extending across its inner end, and which is sufficiently large to straddle over the ridge of the dental plate, as shown, the points or prongs of each tooth being made to fit snugly against the inner and outer sides of the ridge of the dental plate, so as to both strengthen the plate and to brace the tooth securely in position. These grooves enable each tooth to be applied directly to the dental plate, and when applied have much more strength than when fastened in the usual manner, because the teeth can be made to fit the ridge much more perfectly, and at the same time allow the rubber to flow out and along the line of the ridge, giving the tooth a much stronger hold or attachment to the plate than can be done where the teeth are applied to the ridge of the plate in the usual manner, leaving the sides open.

Inserted in each tooth is a pin having a large flat or grooved head, C.

As shown in Fig. 2, the head C extends a suitable distance above the bottom of the groove B, which is made in the tooth A, and thus serves as a stop to prevent the tooth from coming in too close contact with the plaster model upon which the dental plate is to be formed. The head of this pin passes through the wax covering, which is placed upon the model before it is placed in the flask. When the wax is removed, a space is left between the groove in the tooth and the plaster model, and into this space the rubber is wedged while soft and hot, and thus fills all the spaces between the tooth and the model and packs around the head C of the pin. After the rubber plate is vulcanized and the rubber is hardened, the pin thus secures the plate and tooth together. One special advantage of this construction consists in that should a tooth be broken off of a set of teeth a new tooth can be replaced by simply cutting the palatine surface of the plate where the tooth has been broken, then pack in a sufficient quantity of rubber and vulcanize it around the pin-head without interfering with the outside of the plate.

Teeth having recesses made in their inner ends, and having small-headed pins fastened to the teeth in the recesses, have heretofore been made; but the great trouble in attaching this tooth in position upon the dental plate has been that if the material out of which the plate is made is not packed into the recess so as to catch hold of the pin the tooth is liable to become displaced. The proper packing of this material requires great care and skill. By making a deep groove across the inner end of each tooth, leaving it somewhat semicircular in form, it will conform to the ridge of the dental plate after it has been shaped after the natural teeth have been extracted and the gums are ready for artificial teeth. As the grooves made in the inner ends of the teeth enable the lips or points of the grooves to reach high on the dental plate, both on the outer and inner sides of the ridge, the natural shape and size of the tooth may be perfectly imitated. When teeth are flasked, the rubber or other material may be swaged at once upon them without having to pack the same, as in teeth not grooved, as here shown.

Having thus described my invention, I claim—

The combination, with the dental plate, of an artificial tooth, A, having a transverse groove, B, extending across its inner end, so that the ends or prongs of the grooved portions of the tooth will fit snugly against the opposite sides of the ridge of the plate, the sides of said tooth being open, and the flat-headed pin C, secured to the tooth in the bottom of the groove and projecting upward a suitable distance beyond the groove, so as to act as a stop for the tooth and to form a space between the tooth and the model, into which the soft hot rubber is swaged, substantially as shown and described.

In testimony whereof I affix my signature in presence of two witnesses.

EDWARD A. FLOYD.

Witnesses:
W. H. SHELDON,
THOMAS POWELL.